Oct. 1, 1929.                R. R. SAVAGE                1,729,687
                             VEHICLE SEAT
                           Filed April 30, 1928

Inventor
R. R. Savage,
By Clarence A. O'Brien
Attorney

Patented Oct. 1, 1929

1,729,687

UNITED STATES PATENT OFFICE

ROY RAMSEY SAVAGE, OF ABILENE, TEXAS, ASSIGNOR OF ONE-THIRD TO RICHARD D. SUDDATH, OF HENRIETTA, TEXAS

VEHICLE SEAT

Application filed April 30, 1928. Serial No. 273,963.

The present invention relates to improvements in vehicle seats and more particularly to a reclining seat back.

One of the important objects of the present invention is to provide the vehicle with a front seat having a back rest, which can be easily and quickly moved to a horizontal position into alignment with the front and rear back seat bottoms, thereby converting said seats into a bed, so that the vehicle may be used for sleeping purposes whenever desired.

One of the important objects of the present invention is to provide a vehicle seat having a movable back for the front seat, with means for mounting the back so that it may be lifted and then tilted rearwardly and held in a reclining position, the back rest being further capable of being maintained in an upright position against swinging movement when so desired.

Still a further object of the invention is to provide a vehicle seat of the above mentioned character, which is simple in construction, inexpensive, strong and durable, and further well adapted to the purpose for which it is designed.

Other objects of the invention will appear as the nature of the invention proceeds and when taken in connection with the accompanying drawing.

In the accompanying drawing, forming a part of this application, and in which like numerals designate like parts throughout the several views.

Figure 1:
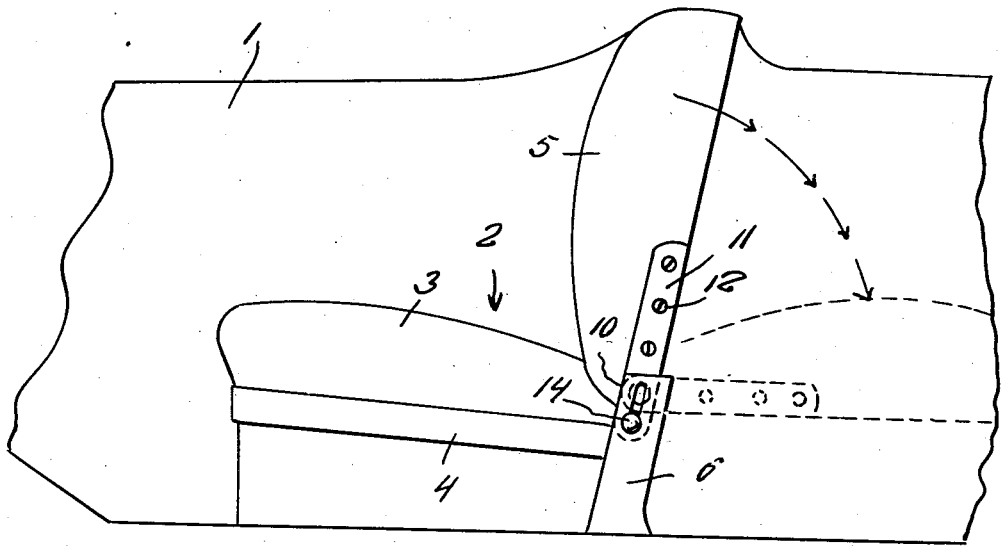
Figure 1 is a side elevation of the front seat of a vehicle, showing the present invention associated therewith.

In the drawing, wherein for the purpose of illustration is shown the preferred embodiment of my invention, the numeral 1 designates generally the body of an automobile, the front seat of which is designated by the numeral 2. The front seat comprises a bottom cushion 3 that is supported on the seat support shown at 4. The cushioned back rest of the front seat is shown at 5.

The mounting for the back rest 5 for the front seat 2 will now be specifically described. A rear corner post 6 is arranged in a stationary manner at each side of the seat support 4, and the inner upper portion of each corner post is cut out as at 7, and furthermore the inner side of the upper portion of each corner post is cut away.

Thus a shoulder 8 is provided, which is located below the upper edge of the corner post, and adjacent the rear side edge. The portion where the cut-out portion 7 terminates, is rounded, as at 9, and a longitudinally extending slot 10 is formed in the upper end of each corner post.

Figure 2:
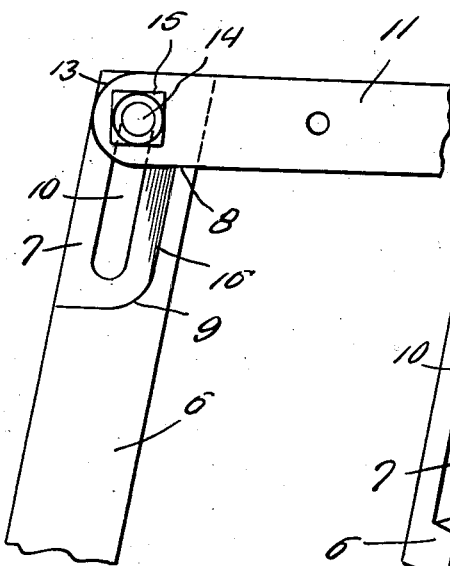
Figure 2 is a detail view of the means for mounting the back rest for the front seat, the part carried by the back rest being shown disposed in a horizontal position, to support the back rest in a reclining position.
Figure 3:
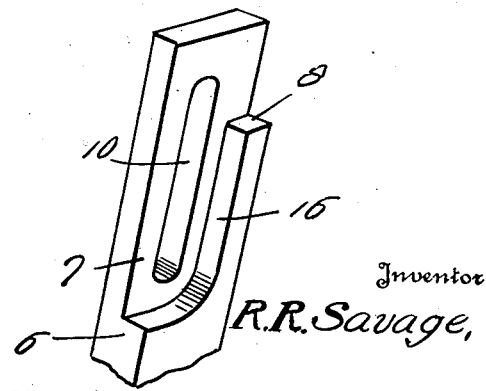
Figure 3 is a fragmentary detail perspective view of the upper end of one of the corner posts for the rear end of the front seat.

A flat strip 11 is rigidly secured at its upper edge portion along each side of the cushioned back rest 5 by any appropriate fastening means such as shown at 12, and the lower end of each strip is rounded, as shown at 13, in Figure 2. A bolt 14 extends through the slot 10 and through an opening formed in the rounded inner end portion of each strip 11, it being understood, of course, that the lower end portion of each strip projects beyond the bottom edge of the back rest 5. A nut 15 is threaded on the threaded inner end of the bolt for engagement with the inner face of the strip 12, and this connection provides a means whereby the strips carried by the sides of the back rest are pivotally and slidably associated with the stationary corner posts 6.

When the rounded lower ends of the strips are disposed in the cut out portion 7, and the rear edge of the depending portion of each strip abuts the shoulder 16, the back rest will be maintained in an upright position, and the bolt 14 will be disposed in the lowermost end of the slot 10.

When it is desired to convert the automobile into a bed, the back rest 5 for the front seat 2 is raised upwardly until the bolt 14 is at the upper end in each slot 10, and then the back rest 5 is swung rearwardly to the position shown in the dotted lines, whereby the rear edge of the inner end portion of the strip 11 will be disposed in engagement with the shoulder 8, and said strips will then be disposed in a substantially horizontal position.

The shoulder 8 will cooperate with the horizontally disposed strip 11 to retain the back rest 5 in a horizontal position so that the back rest will be disposed in alignment with the front and back seat bottoms, thereby converting the seats into a bed, so that the vehicle may be used for sleeping purposes, when so desired.

A vehicle seat structure of the above mentioned character may be used, not only in conjunction with automobiles, but with aeroplanes, railroad coaches and the like.

The simplicity of my construction enables the parts to be readily and easily adjusted, and furthermore, the connection between the seat support and the back rest for the front seat, can be readily and easily attached on conventional front seat structures without necessitating any material alterations.

While I have shown the preferred embodiment of my invention, it is to be understood that minor changes in the size, shape, and arrangement of parts may be resorted to, without departing from the spirit of the invention or the scope of the appended claim.

Having thus described my invention, what I claim as new is:

The combination of a vehicle seat comprising a bottom, a support therefor, and a back rest, corner posts at the rear corners of the seat support, the inner face of each corner post being cut out to form a vertical stop adjacent the rear edge thereof, a lower horizontal stop extending from the lower end of the vertical stop to the forward edge of the corner post, and an upper horizontal stop extending from the forward edge of the vertical stop to the rear edge of the corner post, the upper horizontal stop being located at a point below the upper edge of the corner post, the upper portion of each corner post being formed with a longitudinal slot, a strip secured on the lower edge portion of each side of the back rest and projecting outwardly therefrom, said strip being of a width substantially equal to the distance between the forward edge of each corner post and the adjacent edge of the vertical stop, a bolt extending through the slot and the depending portion of the adjacent strip for pivotally and slidably connecting the strip to the respective corner post, the rear edge of each strip cooperating with the vertical stop to maintain the back rest in an upright position, the lower edge of the strip engaging with the lower horizontal shoulder when the back rest is in an upright position, the rear edge of each strip cooperating with the upper horizontal stop to limit the downward and rearward movement of the back rest when said strip is disengaged entirely from the vertical stop.

In testimony whereof I affix my signature.

ROY RAMSEY SAVAGE.